(12) United States Patent
Singh et al.

(10) Patent No.: US 11,637,502 B2
(45) Date of Patent: Apr. 25, 2023

(54) STARTUP PROCESS FOR A DUAL ACTIVE BRIDGE CONVERTER TO PREVENT OVER-VOLTAGE FAILURE AND THERMAL RUN-AWAY

(71) Applicant: Deere & Company, Moline, IL (US)

(72) Inventors: Brij N. Singh, West Fargo, ND (US); Tianjun Fu, Moline, IL (US); Zachary Wehri, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/484,823

(22) Filed: Sep. 24, 2021

(65) Prior Publication Data

US 2022/0263405 A1 Aug. 18, 2022

Related U.S. Application Data

(60) Provisional application No. 63/118,629, filed on Nov. 25, 2020.

(51) Int. Cl.
*H02M 3/335* (2006.01)
*H02M 1/36* (2007.01)
*H02M 1/32* (2007.01)

(52) U.S. Cl.
CPC ......... *H02M 3/33584* (2013.01); *H02M 1/36* (2013.01); *H02M 1/32* (2013.01); *H02M 3/33573* (2021.05)

(58) Field of Classification Search
CPC .......... H02M 1/32; H02M 1/327; H02M 1/36; H02M 3/335–33592; H02H 9/001; H02H 9/002

See application file for complete search history.

(56) References Cited

U.S. PATENT DOCUMENTS

| | | | |
|---|---|---|---|
| 2019/0052181 A1* | 2/2019 | Murthy-Bellur | .......................... H02M 3/33592 |
| 2021/0135584 A1 | 5/2021 | Dutta et al. | |
| 2021/0249963 A1* | 8/2021 | Kajiyama | ......... H02M 3/33573 |
| 2022/0360160 A1* | 11/2022 | Jeong | .................. H02M 1/0009 |

OTHER PUBLICATIONS

F. Giuliani, N. Delmonte, P. Cova, A. Costabeber and A. Castellazzi, "Soft-starting procedure for dual active bridge converter," 2015 IEEE 16th Workshop on Control and Modeling for Power Electronics (COMPEL), 2015, pp. 1-6, doi: 10.1109/COMPEL.2015.7236516. (Year: 2015).*

(Continued)

*Primary Examiner* — Fred E Finch, III
(74) *Attorney, Agent, or Firm* — Michael G. Monyok

(57) ABSTRACT

A system and method for controlling a dual active bridge based DC/DC converter. A controller implements a startup control scheme and DC bus pre-charge routine to prevent damage to the converter upon startup. During startup of the converter, the startup control process can be used to prevent excessive phase-shift and the DC bus pre-charge routine adjusts the pulse width modulated duty cycle by increasing the dead time between signals, resulting in a decreased DC bus capacitor.

11 Claims, 15 Drawing Sheets

(56) References Cited

OTHER PUBLICATIONS

Z. Zhu, J. Liu, F. Xiao, P. Chen and Q. Ren, "Start-up Procedure and Soft-starting Strategy for Dual Active Bridge Converter," 2020 IEEE 9th International Power Electronics and Motion Control Conference (IPEMC2020-ECCE Asia), 2020, pp. 566-571, doi: 10.1109/IPEMC-ECCEAsia48364.2020.9367737. (Year: 2020).*

European Patent Office Search Report for Appl. No. 21199151.8 dated Mar. 2, 2022.

Saeed, M. et al. "Energization and start-up of CHB-based modular three-stage solid-state transformers." IEEE Transactions on Industry Applications 54, No. 5 (2018): 5483-5492.

Kwak, B. et al. "Inrush current reduction technology of DAB converter for low-voltage battery systems and DC bus connections in DC microgrids" IET Power Electronics 13, No. 8 (2020): 1528-1536.

Zhang, X. et al. "A microprocessor resource-saving dual active bridge control for startup and restart of three-stage modular solid-state transformer." IEEE Transactions on Power Delivery 35, No. 3 (2019): 1443-1454.

Askarian, I. et al. "Phase-shift frequency-variant control for single stage dual active bridge DC/DC converter over a wide input voltage range." In 2015 IEEE International Telecommunications Energy Conference (INTELEC), pp. 1-5. IEEE, 2015.

Anurag. A. et al. "Startup Scheme for the Active Front End Converter in a Medium Voltage Mobile Utility Support Equipment based Solid State Transformer (MUSE-SST)." In IECON 2020 The 46th Annual Conference of the IEEE Industrial Electronics Society, pp. 1487-1492. IEEE, 2020.

* cited by examiner

STARTUP PROCESS FOR A DUAL ACTIVE BRIDGE CONVERTER TO PREVENT OVER-VOLTAGE FAILURE AND THERMAL RUN-AWAY

CROSS-REFERENCE TO RELATED APPLICATIONS

This application claims the benefit under 35 U.S.C. § 119 of U.S. Provisional Application No. 63/118,629, filed Nov. 25, 2020, which is incorporated herein by reference.

STATEMENT REGARDING FEDERALLY SPONSORED RESEARCH

This invention was made with U.S. government support under contract or award No. DE-EE0006521 awarded by the Department of Energy. The Government has certain rights in the invention. The award subrecipient, John Deere Electronic Solutions, Inc., of the aforementioned contract or award elects title to any and all subject inventions set forth in this disclosure for U.S. and any European patent filings.

BACKGROUND OF THE INVENTION

The present invention relates to power converters. More specifically, the invention relates to a system and method for controlling a dual active bridge (DAB) based DC/DC converter.

A DAB converter is a high-efficiency, high-power converter that comprises a primary converter coupled to a secondary converter by a high-frequency transformer, where each converter comprises a plurality of active power switching devices. A controller managing a phase shift between the primary and secondary converters controls the amount and direction of power flow. Three-phase and single-phase DAB based DC/DC converters can be used to realize touch-safe DC power from a high-voltage DC source in a variety of applications, including in a traction inverter used in a heavy-duty off-road vehicle.

Startup of the DAB converter must be carried out by issuing switching commands to devices on the primary-side converter (i.e. the high-voltage source side) and followed by switching commands issued to the secondary-side converter. If not carefully started, the secondary-side converter in a DAB converter not only experiences current in-rush, which is a magnitude order higher than the secondary converter's nominal input current, but also the DC bus of the secondary converter charges up to ~1.3× nominal output voltage. Due to this excessive charge across the DC bus of the secondary converter, some of devices in the secondary converter can fail before a protection system is enacted.

In a typical control system used in a DAB converter, the voltage control bandwidth for a closed-loop DC voltage control is often set to a high value in order to achieve fast dynamics. Due to the high voltage control bandwidth, the phase-shift angle will have a large change during startup. The large phase-shift will require rapid flow of power from the primary converter to the secondary converter, which could further result in current in-rush experienced by the output capacitor, resulting in an excessive high peak value of current flowing at the input of the secondary converter. The current in-rush can trigger the gate drive de-sat faults in the secondary converter and often this current in-rush will instantly damage some of power devices in the secondary converter. It would therefore be advantageous to develop a control process to reduce the risk of damage to the DAB converter during startup.

BRIEF SUMMARY

According to embodiments of the present invention is a control process used to prevent damage to a DAB converter during startup. In one embodiment, the process comprises a multi-step approach: pre-charge control and startup control. The pre-charge step increases the dead time of the pulse-width modulated signal to reduce the duty cycle, leading to a reduction in the DC bus capacitor current during startup. During the startup control step, control bandwidth is limited by slewing the gains of a proportional-integral controller during the startup, preventing large changes in the phase-shift angle. A controller implementing the startup routine is also disclosed.

DETAILED DESCRIPTION

Figure 1:
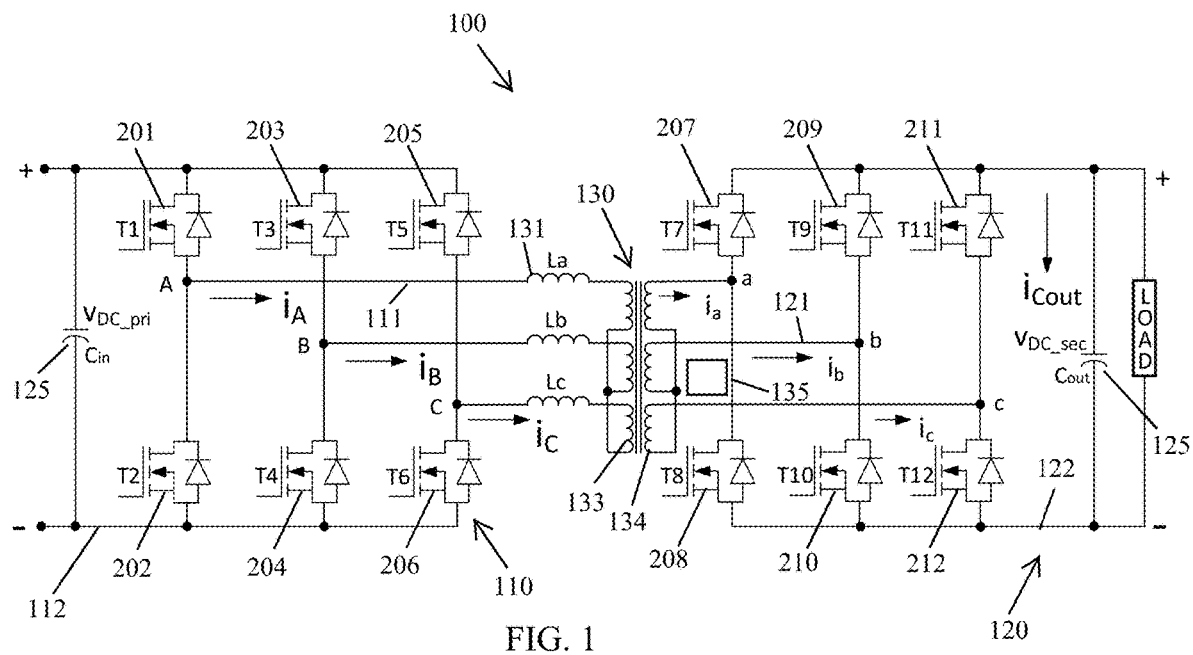
FIG. 1 is a circuit diagram of a three-phase dual active bridge based (DAB3) DC/DC converter.

A three-phase dual active bridge based (DAB3) DC/DC converter 100 is shown in FIG. 1. The DAB3 converter 100 has a primary converter 110 and a secondary converter 120 with alternating current (AC) outputs 111/121 of both converters 110/120 connected via an isolation transformer 130 with a turn ratio of N:1. Alternatively, the primary converter 110 and the secondary converter 120 may be coupled by a transformer 130 and one or more inductors 131. The DAB3 converter 100 includes a primary converter 110 comprising a plurality of power devices (or switches) 201, 202, 203, 204, 205, and 206 and a secondary converter 120 comprising a plurality of power devices 207, 208, 209, 210, 211, and 212. As shown in FIG. 1, a pair of devices (i.e. 201/202, 203/204, and 205/206) with each of phase A, phase B, and phase C. Further shown in FIG. 1 is a current sensor 135.

The power devices 201-212 may comprise an insulated gate bipolar transistor, a metal oxide semiconductor field effect transistor, a silicon carbide field effect transistor, or a similar semiconductor device. In the example embodiment shown in FIG. 1, the power switching devices 201-206 are coupled between direct current terminals 112 of the primary converter 110 and the secondary switches 207-212 are coupled between direct current terminals 122 of the secondary converter 120. Further, in one embodiment, a primary winding 133 of the transformer 130 is coupled to output terminals of the primary power devices 201-206, whereas a secondary winding 134 of the transformer 130 is coupled to output terminals of the secondary power devices 207-212. As such, the primary winding 133 of the transformer 130 is coupled to the primary AC terminal 111 and is associated with a primary alternating current signal of the primary converter 110; similarly, the secondary winding 134 of the transformer 130 is coupled to the secondary AC terminal 121 and is associated with a secondary alternating current signal of the secondary converter 120.

Figure 2:
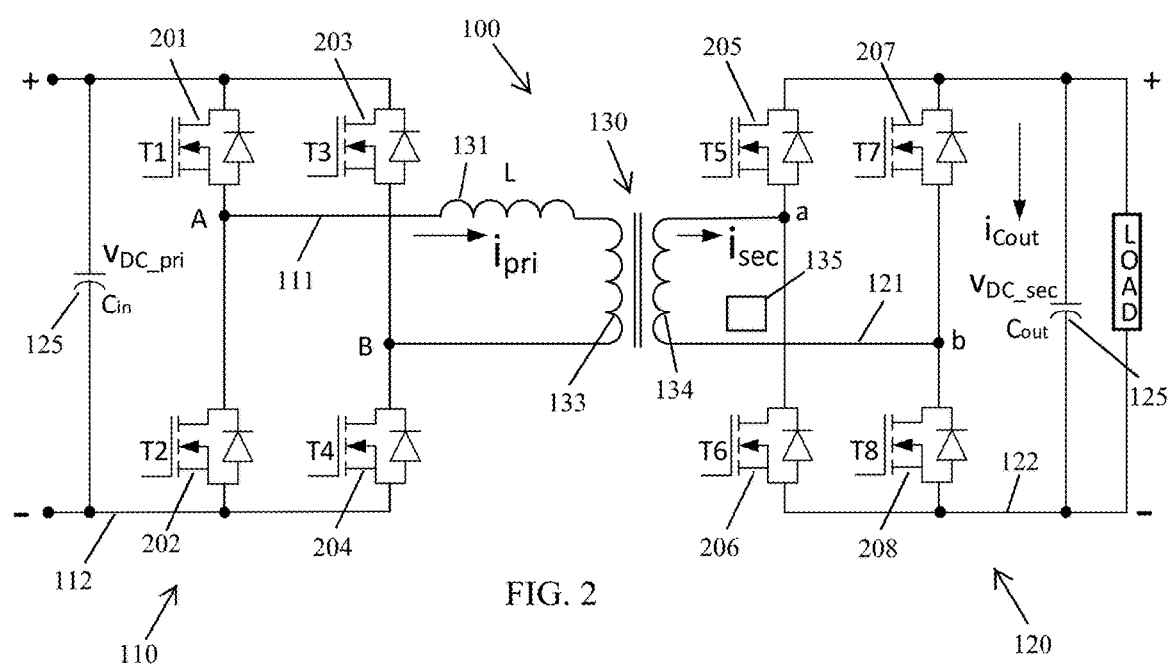
FIG. 2 is a circuit diagram of a single-phase dual active bridge based (DAB1) DC/DC converter.

FIG. 2 shows a single-phase dual active bridge based (DAB1) DC/DC converter 100. The DAB1 converter 100 has a similar topology to the DAB3 converter 100, but with differences attributed to single-phase use. The DAB1 converter 100 includes a primary converter 110 comprising a plurality of power devices 201, 202, 203, and 204 and a secondary converter 120 comprising a plurality of power devices 205, 206, 207, and 208. Like reference numbers indicate like features or elements.

Figure 3:
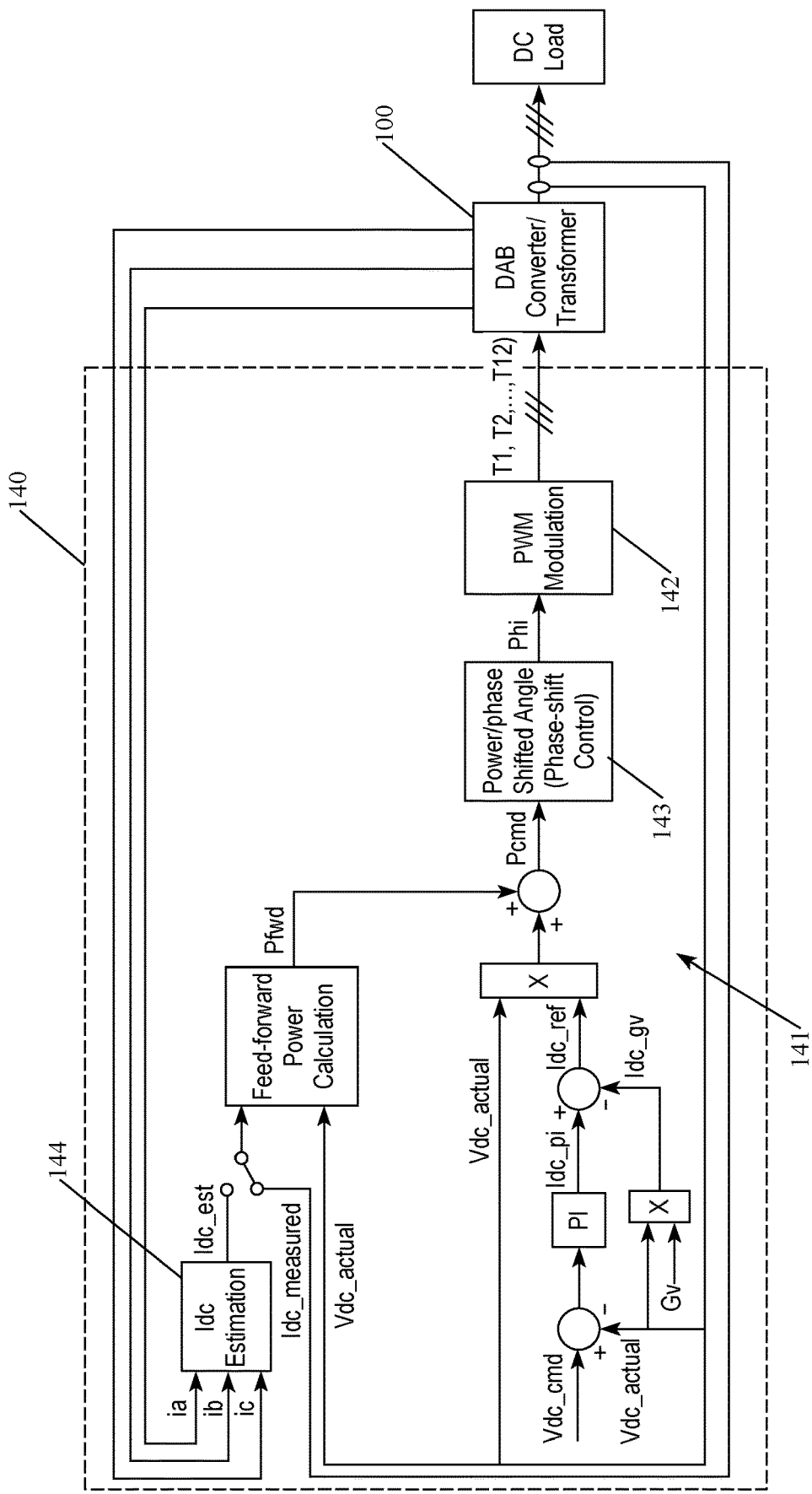
FIG. 3 shows a control system of a DAB3 converter, according to one embodiment.

A control system or controller 140 for the DAB3 converter 100, according to one embodiment, is shown in FIG. 3. A similar controller 140 can be used for the DAB1 converter 100. The control system 140 may include an electronic data processor 141 comprising one or more of: a field programmable gate array (FPGA), a microprocessor, a microcontroller, a programmable logic device, an arithmetic logic unit, a Boolean logic unit, an electronic circuit or system, a digital circuit, a digital signal processor (DSP), an application specific integrated circuit (ASIC), or another data processing device. In one embodiment, the electronic data processor 141 can execute software instructions. The control system 140 is adapted to implement a scheme to realize phase-shifted pulse width modulated (PWM) switching signals for the primary converter devices 201-206 and secondary converter devices 207-212. As shown in FIG. 3, in one embodiment, the control system 140 may rely upon a PWM modulator 142, a phase-shift controller 143, and an estimator 144. Alternatively, the modulator 142, controller 143, and estimator 144 may be incorporated into the electronic data processor 141. The estimator 144 is adapted to estimate a direct current (or change in DC current versus time) at the secondary direct current terminals (e.g., $i_{C_{out}}$) based on the measured alternating current. In one embodiment, during normal operation, the control system 140 is configured to provide time-synchronized control signals to the control terminals of the primary switches 201-206 and the secondary switches 207-212 to control the converter 100 at a fundamental switching frequency.

Figure 4:
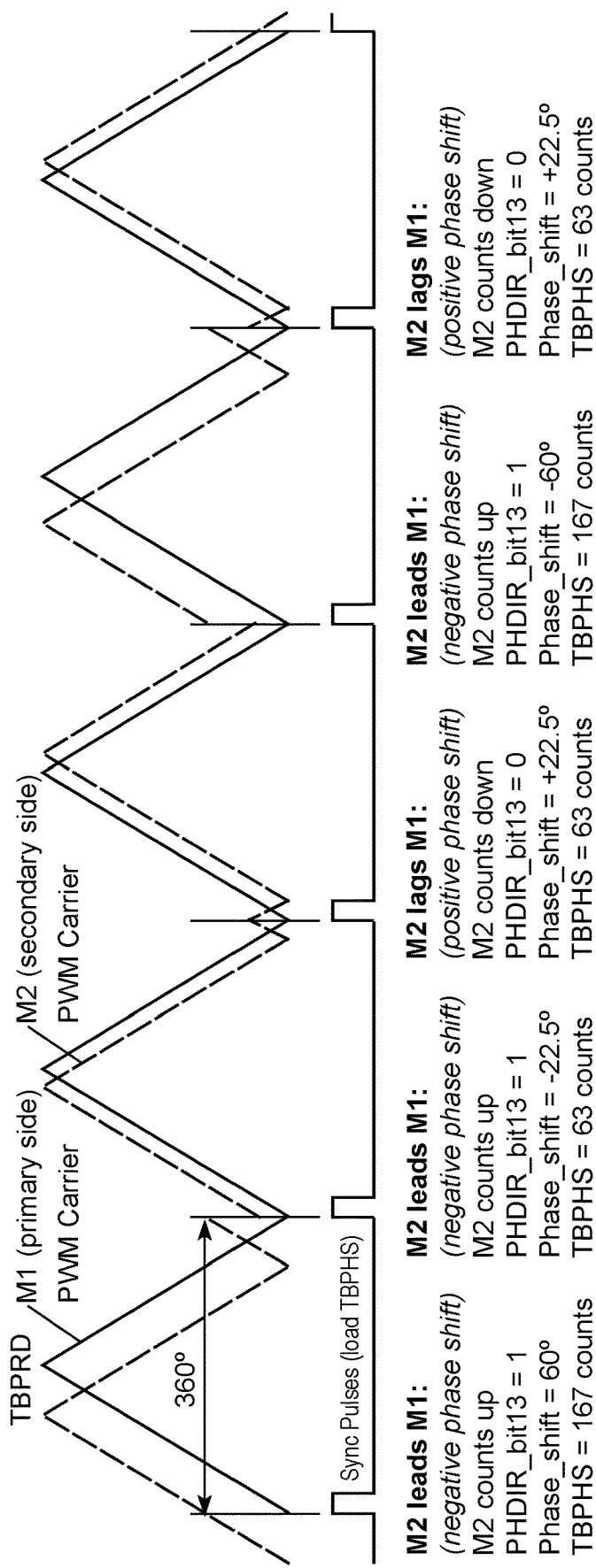
FIG. 4 is a PWM modulation scheme for the phase-shift-controlled DAB3 converter.

FIG. 4 illustrates PWM modulation for a phase-shift-controlled DAB3 100. In one embodiment, the electronic data processor 141 comprises a FPGA, where the code has a hardcoded relationship with a 120 degree phase shift between the phase A carrier and the phase B carrier. It also hardcodes a 240 degree phase shift between the phase A carrier and the phase C carrier. However, the PWM duty cycle is fixed to 50% on all phases.

For the graph depicted in FIG. 4, the PWM frequency is 100 kHz with a phase angle of 180 degrees, resulting in an angle/count of 0.36 degrees/count and a time-base period (TBPRD) of 500 counts over a sample time of 10 ns. The PWM counts slew rate is 200 counts per PWM cycle (72 degrees/cycle). For the time-base phase (TBPHS):

$$TBPHS(phase\_shift)=[phase\_shift(degrees)/180]*TBPRD.$$

The phase shift angle is less than or equal to +90 degrees and greater than or equal to −90 degrees.

Figure 5:
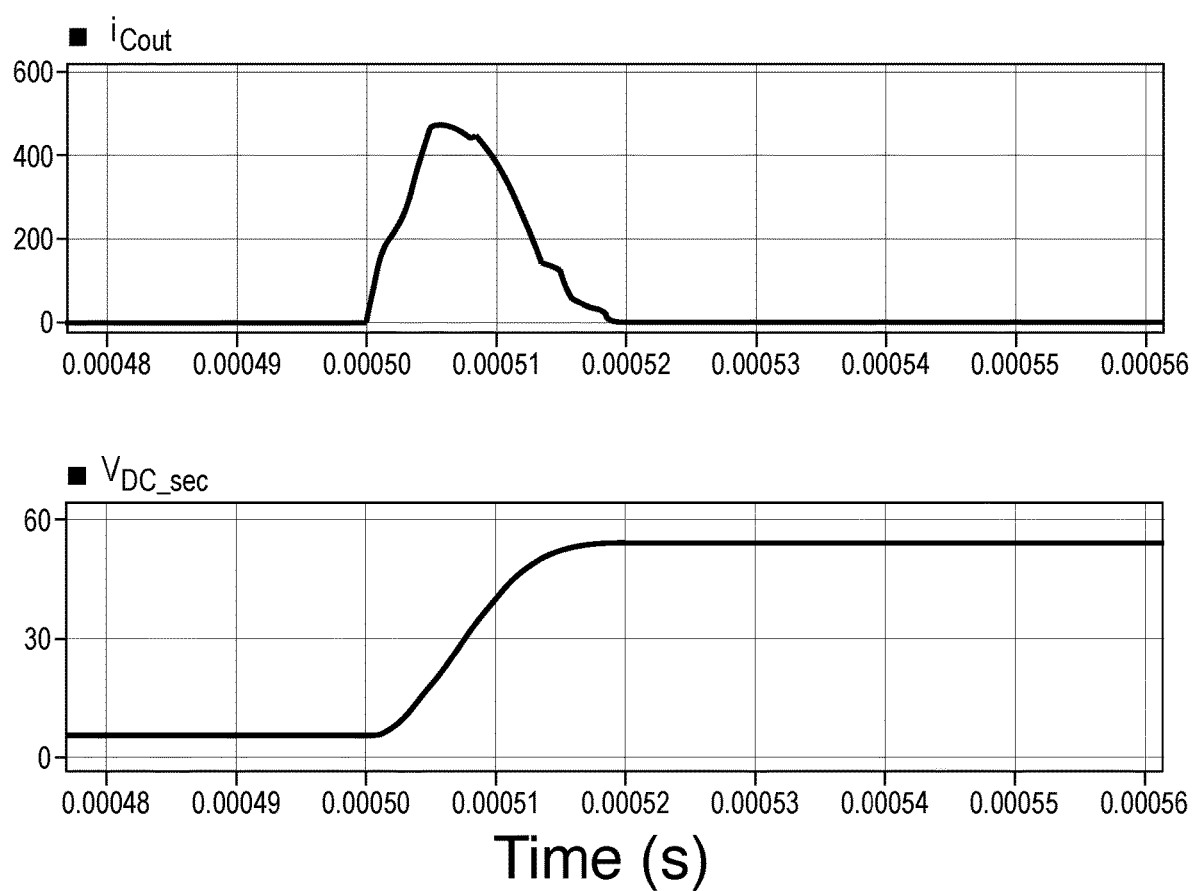
FIG. 5 shows the waveforms of the secondary converter in a DAB3 converter upon start-up.

Upon PWM switching of power devices 201, 202, 203, 204, 205, and 206 in the primary converter 110 of the DAB3 100, the current in-rush ($i_{C_{out}}$) is observed on the DC bus capacitor 125 of the secondary converter 120. This current in-rush ($i_{C_{out}}$) is illustrated in FIG. 5 along with DC bus voltage ($V_{DC\_sec}$) across the secondary converter 120 in the DAB3 100. FIG. 5 depicts the waveforms of secondary converter 120 in DAB3 100 upon startup of PWM signals for the primary converter 110, where the primary converter 110 is switching at a 50% duty cycle. As shown in FIG. 5, the current in-rush ($i_{C_{out}}$) is sufficiently large that the $V_{DC\_sec}$ gets to a nominal value within one PWM switching cycle of DAB3 devices 201, 202, 203, 204, 205, and 206.

Referring again to FIG. 5, in the control system 140 for the DAB3-based converter 100, when the 50% duty cycle-based PWM signals are enabled for devices in the primary converter 110, the charge current of the DC bus capacitor 125 of the secondary converter 120 will have a large change due to a large change on the $V_{DC\_sec}$ voltage (dv/dt). FIG. 5 shows the DC bus capacitor current ($i_{C_{out}}$) and voltage ($V_{DC\_sec}$) in the phase-shift control mode when the primary converter 110 in the DAB3 converter 100 is modulated with a 50% duty-cycle and the secondary converter 120 is yet to be enabled with no load on the secondary converter 120. The scenario depicted in FIG. 5 can be encountered during the startup of a DAB based converter 100.

Figure 6:
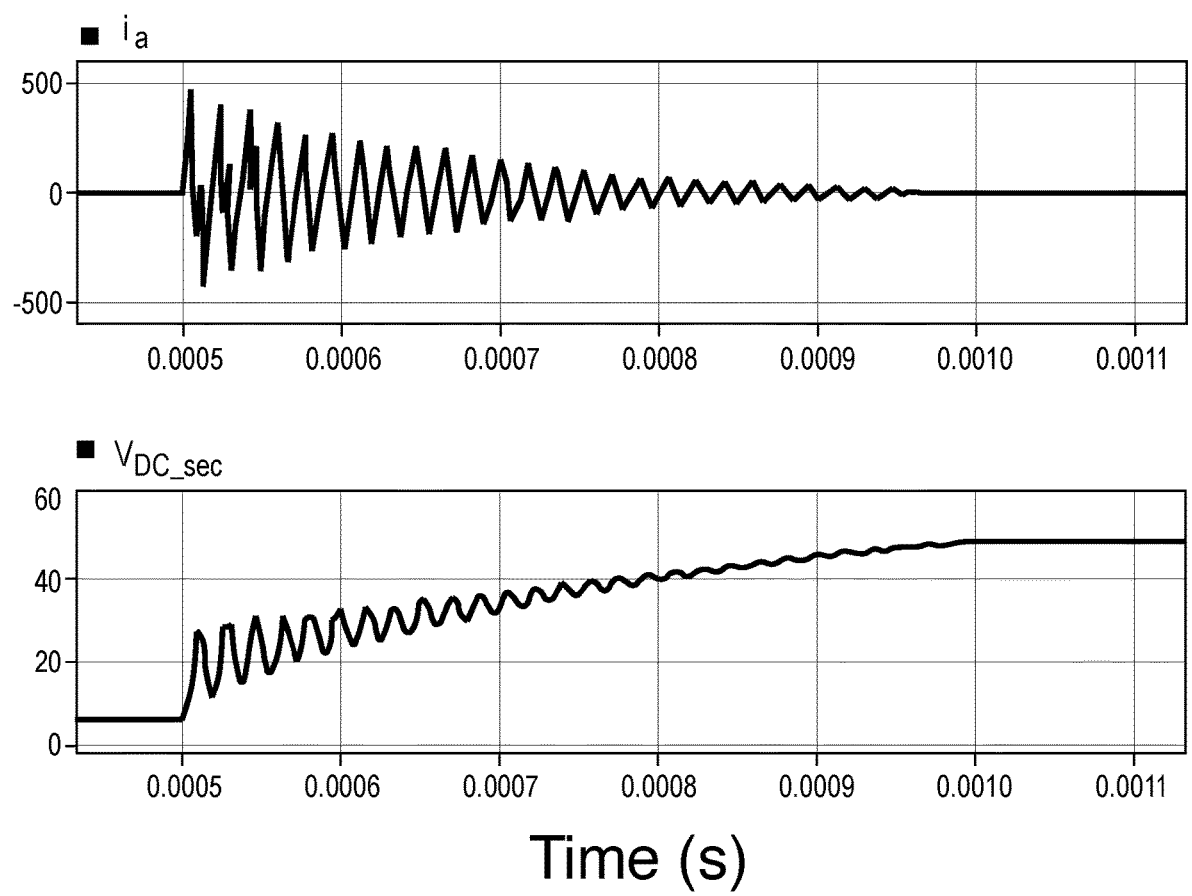
FIG. 6 shows the waveforms of the secondary converter in a DAB3 converter with 50% duty cycle based PWM switching of the primary converter devices and 50% duty cycle based PWM switching of the secondary converter devices.

FIG. 6 illustrates waveform of the secondary converter 120. In the embodiment used in this example, the DAB3 100 operates in a phase-shift control mode, with both the primary converter 110 and the secondary converter 120 simultaneously PWM enabled with a 50% fixed duty cycle. However, there exists a necessary phase-shift between PWM signals for the primary converter devices (201, 202, 203, 204, 205, and 206) and the secondary converter devices (207, 208, 209, 210, 211, and 212).

The larger change in currents handled by secondary converter switches (207, 208, 209, 210, 211, and 212) can trigger gate drive de-sat faults in the secondary converter 120 of the DAB3 100, resulting in nuisance and unwanted faults at start-up. When deployed in a vehicular application, the unwanted faults at startup could lead to customer dissatisfaction. In addition, often the current magnitude handled by power devices (207, 208, 209, 210, 211, and 212) is far higher than their rated ampacity, resulting in instant thermal destruction of these power devices (207, 208, 209, 210, 211, and 212). This damage can occur despite the short duration of the large current flow through the devices (207, 208, 209, 210, 211, and 212) in the secondary converter 120.

To reduce the large current when PWM switching of the primary converter 110 and secondary converter 120 is enabled, the PWM duty cycles can be set to a smaller value. In some applications of a DAB based converter 100, the PWM duty cycles cannot be adjusted directly in the application software. For example, in one embodiment, the PWM duty is set in the control system 140 with a fixed 50% duty in the phase-shift operational control mode and cannot be adjusted directly in the application software. Instead of adjusting the PWM duty directly, the PWM duty cycles can be adjusted by controlling the dead time, or the time between signals. Increasing the dead time can lead to a reduction in the DC bus capacitor current during startup. Alternatively, in the phase-shift operational control mode of the DAB 100, in order to reduce the capacitor current when PWM signaling is enabled for both the primary converter 110 and the secondary converter 120, a pre-charge control scheme is applied.

Secondary Converter DC Bus Pre-Charge Routine

Figure 7:
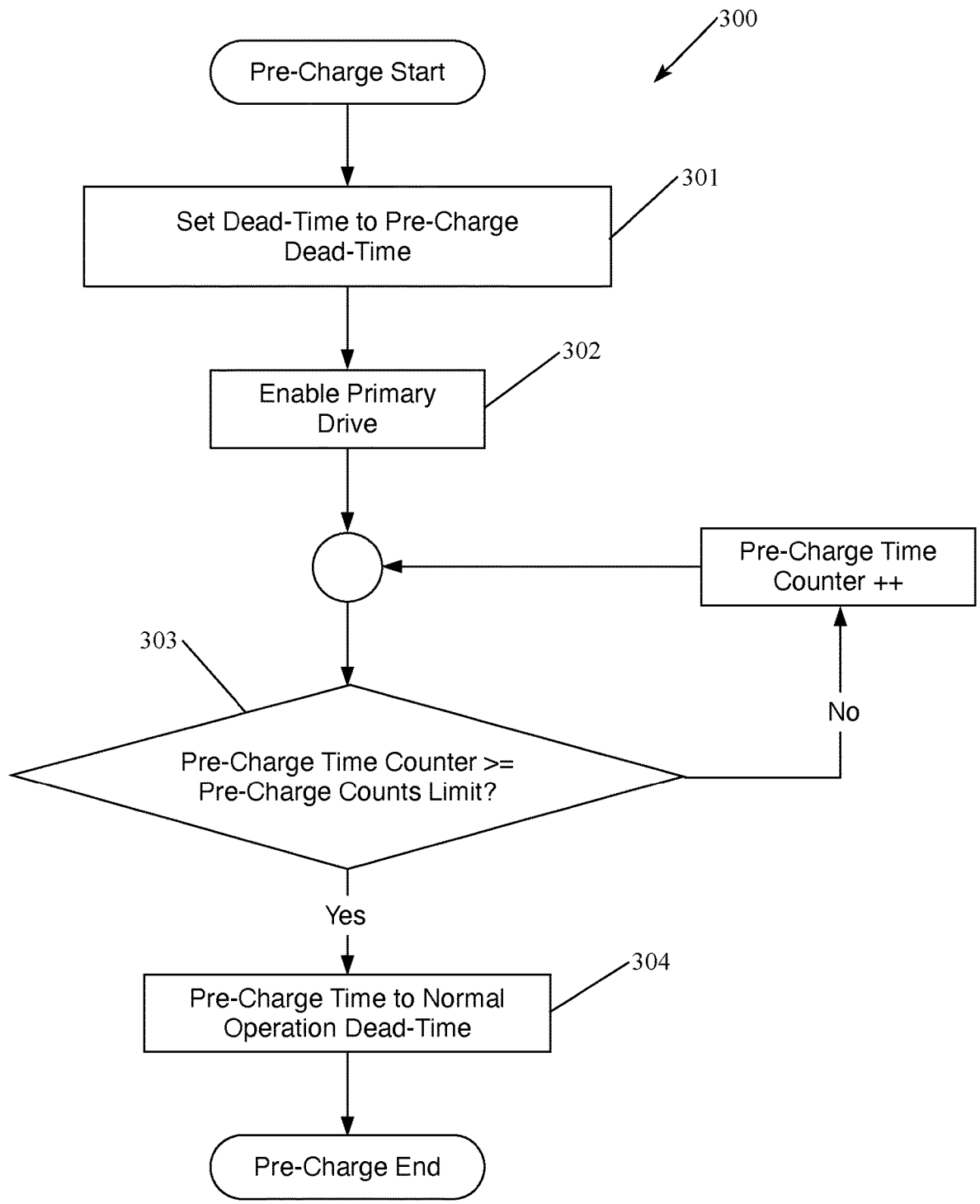
FIG. 7 depicts the secondary converter DC bus pre-charge routine.

FIG. 7 depicts a pre-charge control scheme 300. At step 301, the dead time is set to a pre-charge specific dead time. Next, at step 302, the primary drive is enabled. Next, at step 303, it is determined whether the pre-charge time counter is greater than or equal to the pre-charge counts limit. If not, the pre-charge time counter is increased before checking again. If the pre-charge time counter meets or exceeds the threshold, then at step 304 the dead time is set at a normal operational mode specific dead time.

Figure 8:
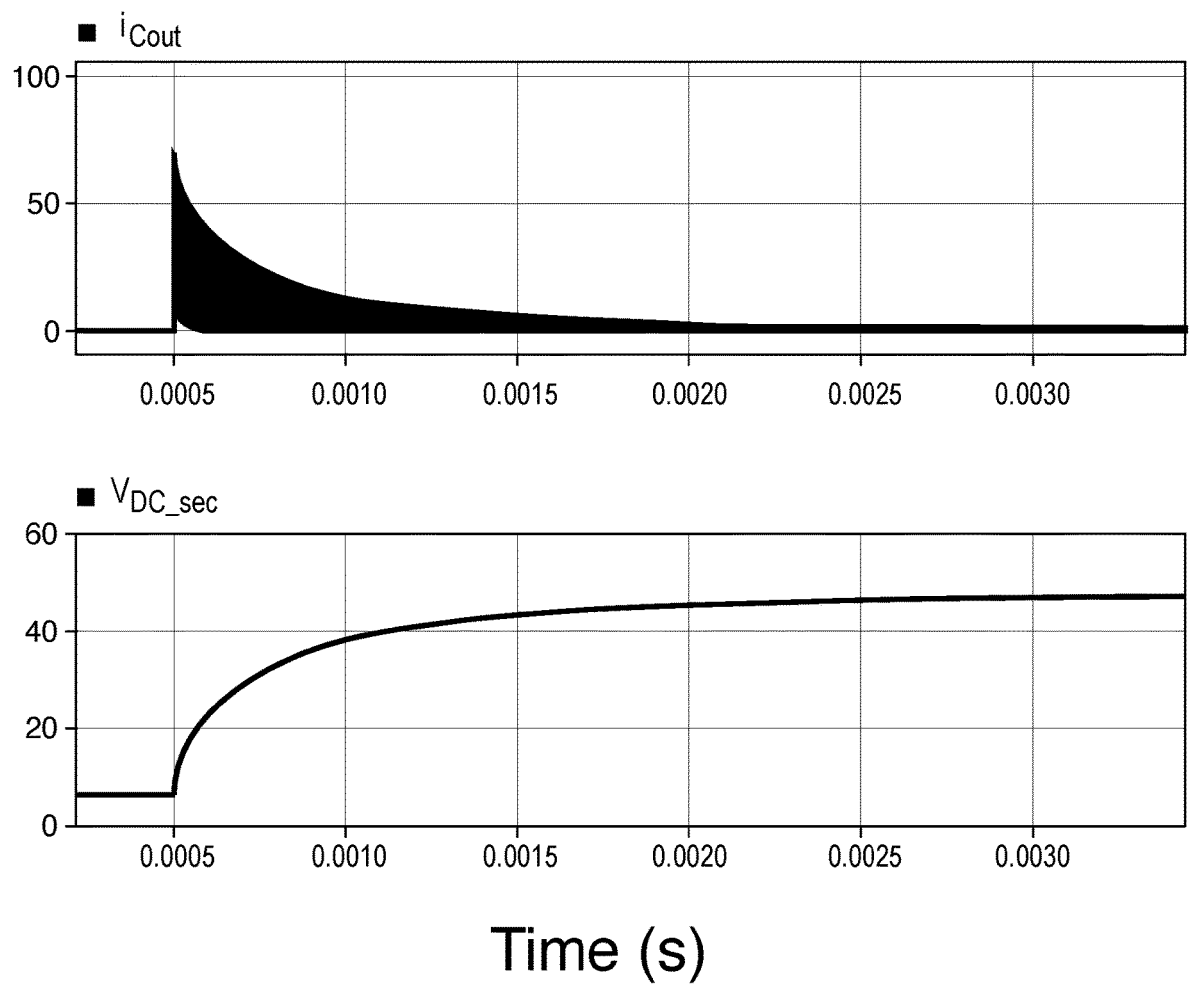
FIG. 8 shows the waveforms of the secondary converter in a DAB3 converter upon startup of PWM signals for the primary converter, when the primary converter switching is at a 20% duty cycle.

For example, for a DAB control system 140 with a 50 kHz PWM frequency, the time-based period of the PWM is 20 µs. The time period of the switching ON for a 50% PWM duty is 10 µs. Thus, to achieve a 20% PWM duty cycle control, the dead time can be set to 6 µs. FIG. 8 illustrates the DC bus capacitor current ($i_{Cout}$) and voltage ($v_{DC\_sec}$) when the dead time is set to 6 µs and the PWM frequency is set to 50 kHz in the DAB control system 140. As shown in FIG. 8, the waveforms of the secondary converter 120 in DAB3 100 upon start-up of PWM signals for the primary converter 110 are shown for switching at 20% duty cycle. The in-rush current through output capacitor 125 is a magnitude order smaller compared to a 50% duty cycle (see FIG. 5). While a 20% duty cycle is used in this example embodiment, the startup mode duty cycle can vary and is set to a value less than the operational mode duty cycle, which can also vary. In one alternative embodiment, the duty cycle can be set between about 15% to 60%.

Figure 9:
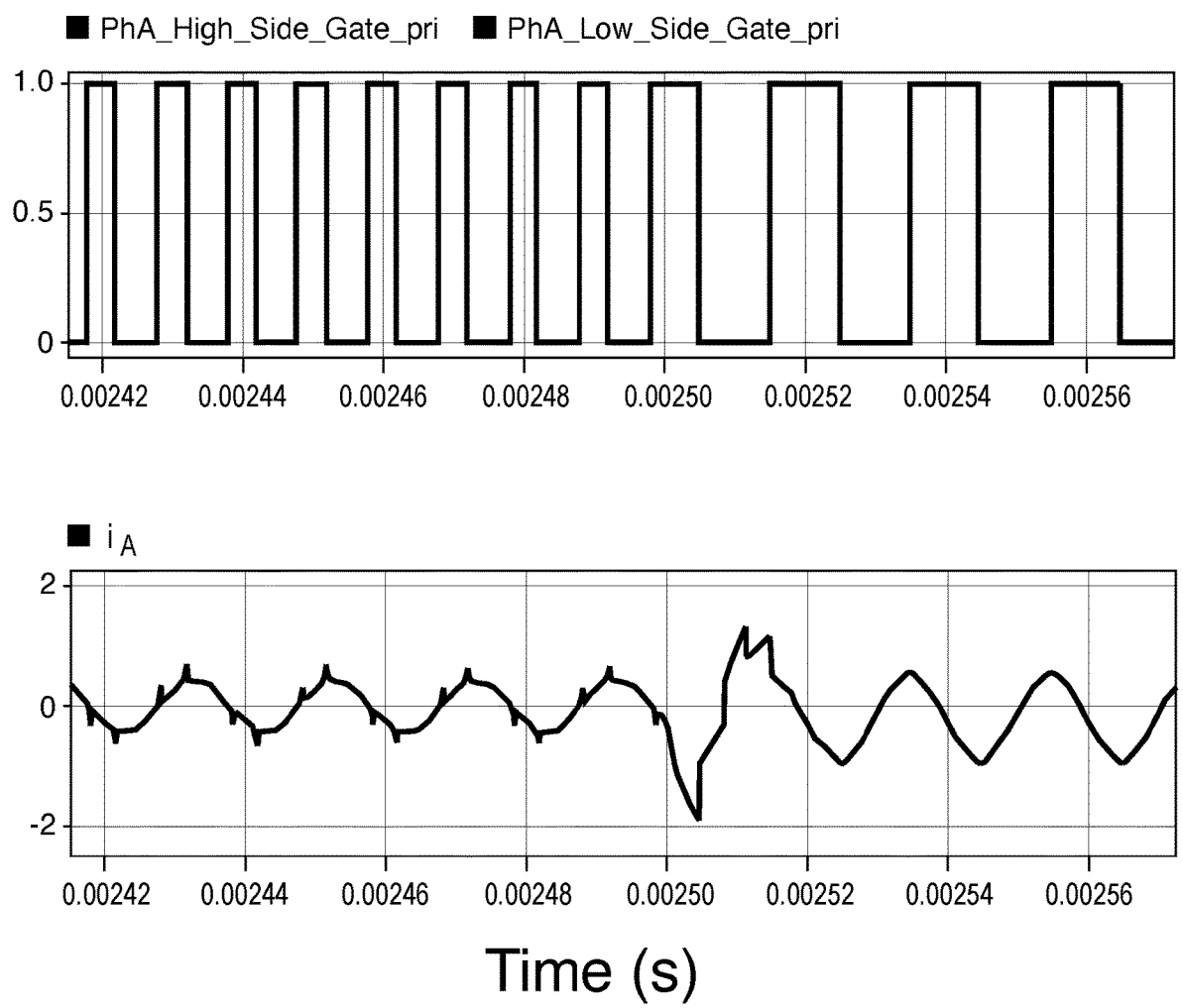
FIG. 9 shows the PWM signals for phase-A of the primary converter and phase A output current of the primary converter.

FIG. 9 illustrates the results when the secondary converter 120 DC bus is under the pre-charge control scheme 300 with a PWM dead time of 6 µs followed by normal dead time of 200 ns post pre-charge of the DC bus of the secondary converter 120. In FIG. 9, 'PhA_High_Side_Gate_pri' and 'PhA_Low_Side_Gate_pri' are the primary converter 110 phase A high-side and low-side gate drive commands, e.g. PWM signal. The quantity '$i_A$' is the phase A current out from the primary converter 110. FIG. 9 shows PWM signals for phase A of the primary converter 110 and phase A output current of the primary converter 110. Both the primary converter 110 and the secondary converter 120 are operated in phase-shifted mode with 6 µs dead-time during pre-charge of the DC bus of the secondary converter 120 followed by 200 ns dead time post pre-charge of the DC bus of the secondary converter 120.

Figure 10A:
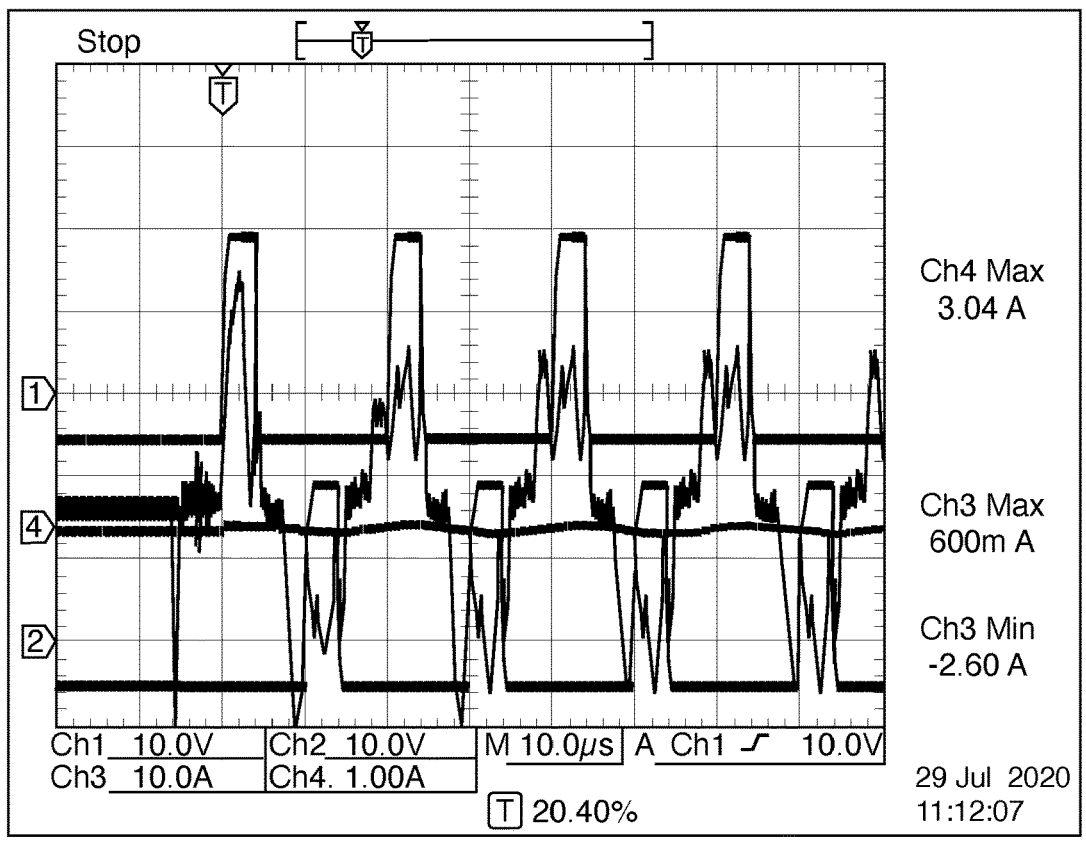
FIG. 10A is a graph of waveforms during pre-charge (20% PWM duty) of the DC bus of the secondary converter.
Figure 10B:
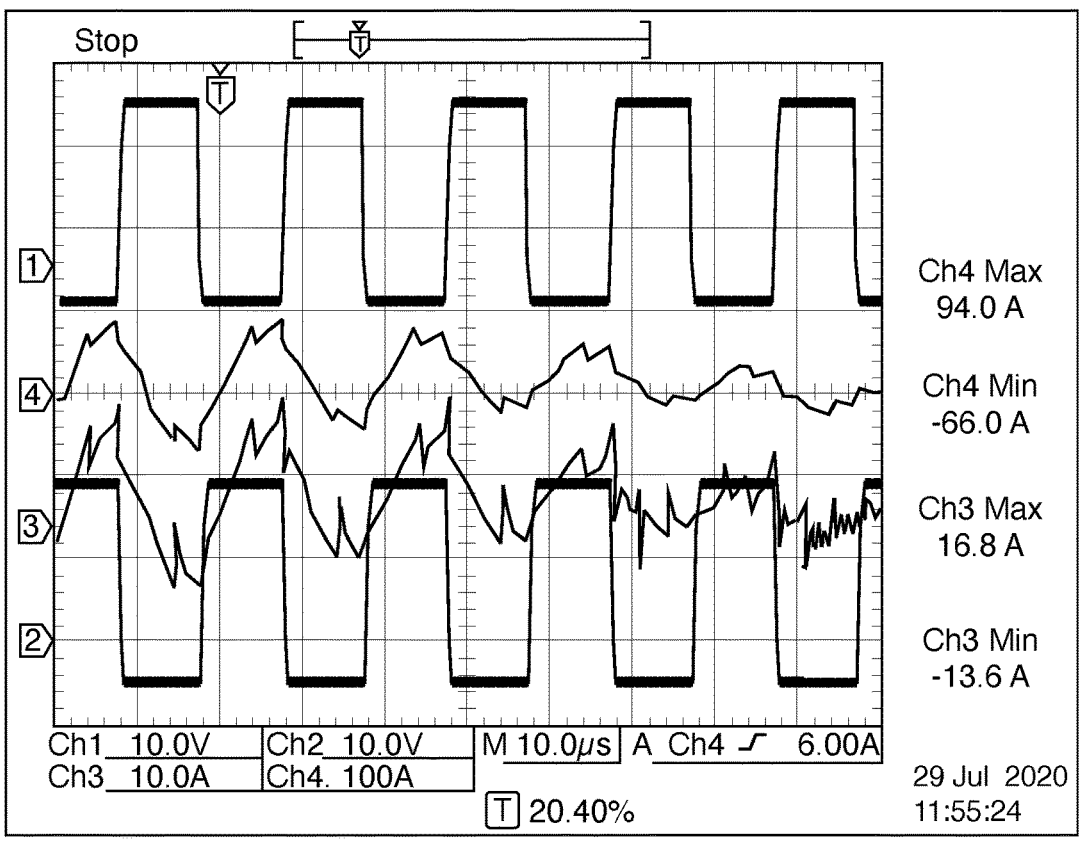
FIG. 10B is a graph of waveforms during normal 50% duty cycle based PWM signaling of the DAB3 converter in phase-shift mode.

FIGS. 10A-10B show the high-side (201) and low-side (202) PWM signals for phase-A of primary converter 110 and primary and secondary currents of the DAB3 100. FIG. 10A depicts the waveforms during pre-charge of the DC bus of the secondary converter 120, whereas FIG. 10B depicts the waveforms during a default 50% duty cycle of the DAB3 100 in phase shift mode. In both examples, the converter 100 is switching but in phase shift mode. More specifically, FIGS. 10A-10B illustrate the results when (i) the dead time is set to 6 µs, resulting in a 20% PWM duty cycle (FIG. 10A) and (ii) the dead time is changed back to the default deadtime of 200 ns, resulting in the default mode of 50% PWM duty cycles (FIG. 10B). As shown in FIGS. 10A-10B, Channel 1 (Ch1) is the gate command for switch 201, Channel 2 (Ch2) is the gate command for switch 202, Channel 3 (Ch3) is the phase A current (iA) output from the primary converter 110 and Channel 4 (Ch4) is the phase A current (ia) input to the secondary converter 120.

Startup Control

As previously described, the startup process for a DAB1 or DAB3 converter 100 can lead to excessive phase-shift. In a DAB control system 140, the voltage control bandwidth for a closed-loop DC voltage control is typically set to a relatively high value in order to achieve fast dynamics. Due to the high voltage control bandwidth, the phase-shift angle will have a large change during startup. The large phase-shift will require rapid flow of power from the primary converter 110 to the secondary converter 120, which could result in current in-rush ($i_{Cout}$) experienced by output capacitor 125 ($C_{out}$). A current in-rush ($i_{Cout}$) leads to an excessively high peak value of current ($i_a$ in FIG. 6) flowing at the input of the secondary converter 120. The current in-rush (signal is in FIG. 1 and results shown in FIG. 6) will trigger the gate drive de-sat faults in the secondary converter 120 and often this current in-rush will instantly damage some of the power devices (such as 207, 208, 209, 210, 211, and 212) in the secondary converter 120.

Figure 11:
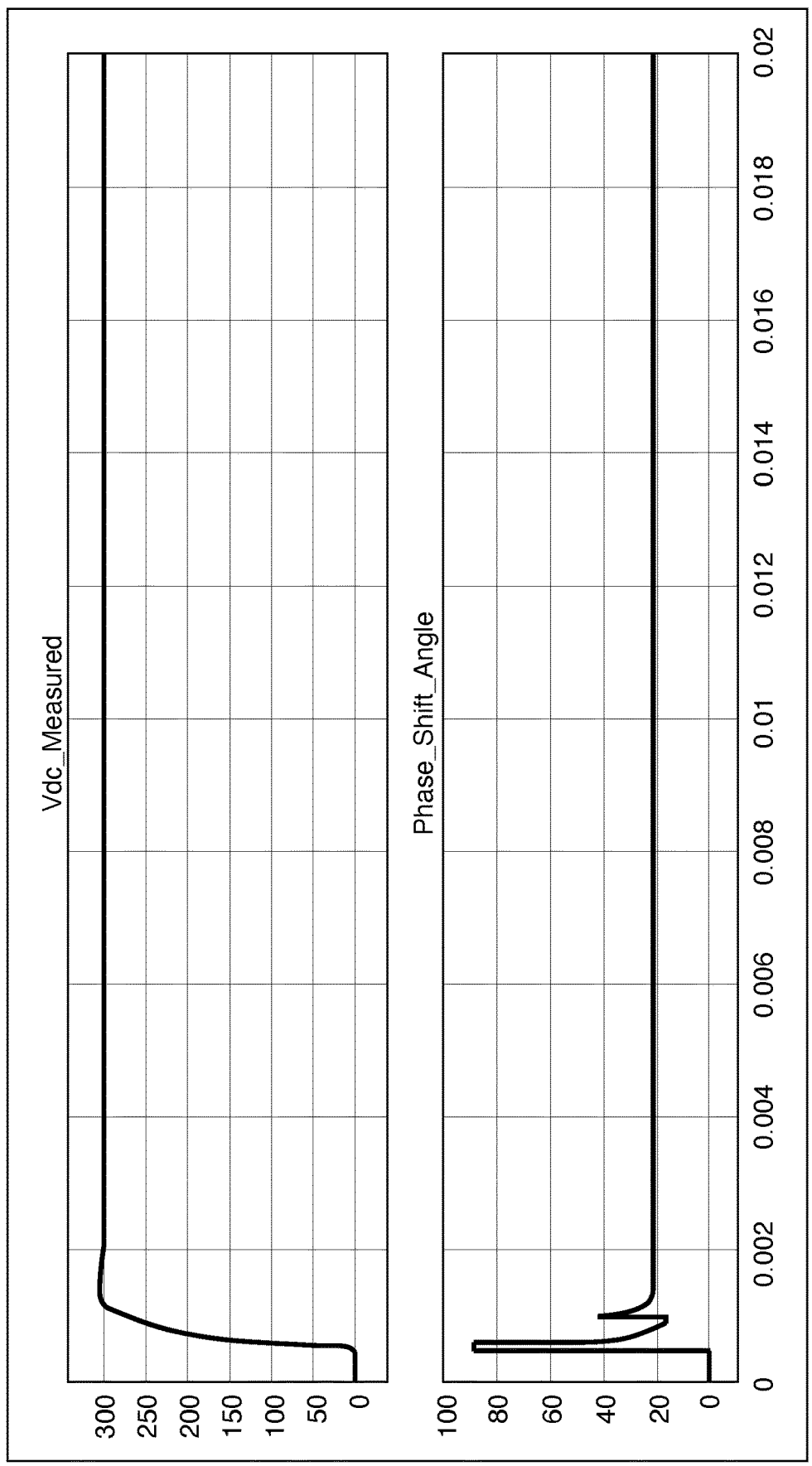
FIG. 11 are results for the DAB1 converter.
Figure 12:
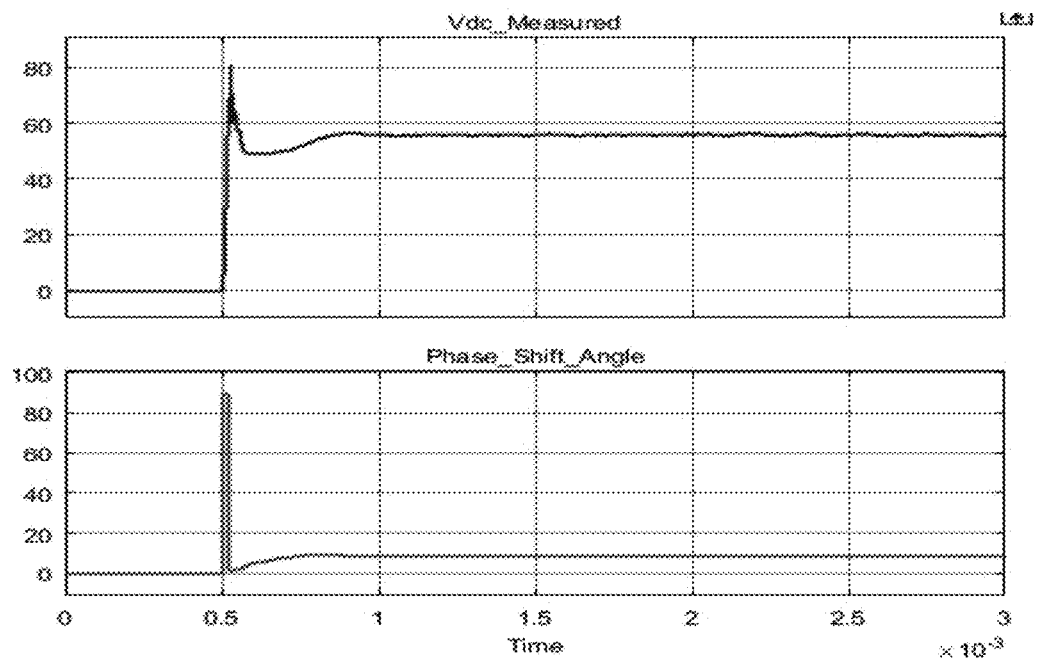
FIG. 12 are results for the DAB3 converter.

FIG. 11 illustrates the result for a single-phase DAB converter 100. The phase-shift angle changes from 0 degree to the maximum angle (90 degrees) during startup. As shown in FIG. 11, the top waveform is the voltage across the DC bus of the secondary converter 120 and the bottom signal indicates the phase-shift between PWM signals for devices in the primary converter 110 and the secondary converter 120. The commanded output voltage for the DAB1 converter 100 is 300 V. FIG. 12 illustrates the result for a three-phase DAB converter 100. The phase-shift angle changes from 0 degree to the maximum angle (90 degrees) during startup. As shown in FIG. 12, the top waveform is the voltage across the DC bus of the secondary converter 120 and the bottom signal indicates the phase-shift between PWM signals for devices in the primary converter 110 and the secondary converter 120. The commanded output voltage for the DAB3 converter 100 is 56 V. This abrupt change in phase-shift angle stresses the controller bandwidth in addition to causing an excessive current in-rush ($i_{Cout}$) and a large overshoot in the DC voltage output ($V_{DC\_sec}$) of the secondary converter 120.

Figure 13:
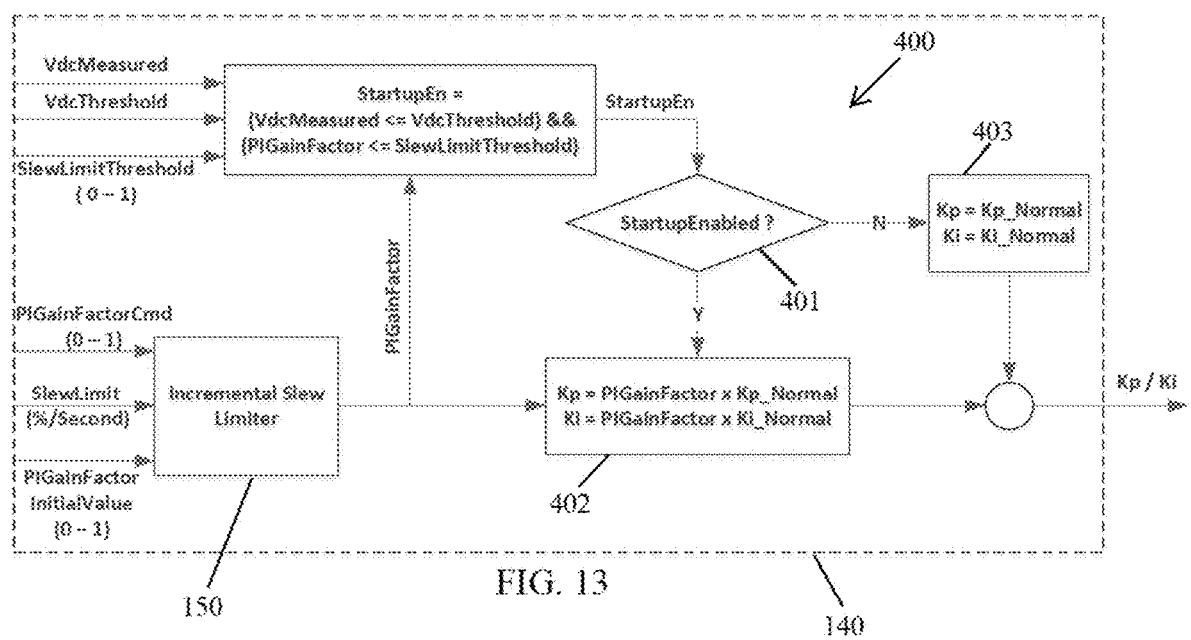
FIG. 13 is the startup control system for the DAB3 converter.

The startup control process 400 can be used to prevent excessive phase-shift during startup of a DAB1 converter 100 and a DAB3 converter 100. FIG. 13 is a flowchart of the startup process 400, according to one example embodiment. As shown in FIG. 13, at step 401, the startup process is enabled. The process can be enabled if certain operational parameters are met, such as the measured voltage on the DC bus and the PI gain factor. If the startup control scheme 400 is enabled, at step 402, the normal proportional gain is adjusted. If the startup scheme 400 is not enabled, at step 403, the unadjusted normal proportional gain is used.

The process 400 limits the bandwidth of the proportional and integral (PI) controller for the DC bus voltage control of the secondary converter 120 in the DAB3 converter 100. Bandwidth is limited by slewing the gains of the PI controller during the startup, preventing large changes in phase-shift angle during startup.

As part of the process depicted in FIG. 13, the DC bus voltage across the secondary converter 120 is measured. Based on value of $V_{DC\_sec}$, the startup feature is enabled or disabled. To determine whether the startup process should be enabled, the measured DC bus voltage ($V_{DC\_sec}$) is compared with a voltage threshold and the PI gain factor is compared with a threshold of the PI gain slew limit. When the measured voltage is equal to or less than the voltage threshold and the PI gain factor is equal to or less than the threshold of the PI gain slew limit, the startup feature is enabled; otherwise the startup feature is disabled.

Referring again to FIG. 13, the Incremental Slew Limiter 150 is used to calculate the PI gain factor. The inputs to this Incremental Slew Limiter 150 are the PI gain factor command, PI gain factor slew limit, and PI gain factor initial value. The initial value of the PI gain factor is used to set the initial value of the PI gain factor during the startup and the value can be set between 0 and 1; the PI gain factor command is set to determine the final value of the PI gain factor and the maximum value is limited to 1; the PI gain factor slew limit is set to determine the slew rate of PI gain factor from the initial value to the final value.

The value of the PI gain factor command can be set between 0 and 1. For example, when the PI gain factor command is set 0.5, the PI gain factor will be slewing from the PI gain factor initial value to 0.5 and limited to 0.5 during the startup. In this example embodiment, the PI gains are limited to 50% of the preset values during the startup. After the measured voltage is greater than the voltage threshold, for example, 90% voltage command, and the PI gain factor is greater than the threshold of the PI gain slew limit, for example, 0.45, the startup control is disabled.

When the startup feature is enabled, the PI gains of the DC voltage control are determined by a PI gain factor and the preset PI gains, which means the proportional gain $K_p$ equals to PI gain factor times the preset proportional gain $K_{p\_Normal}$, the integral gain $K_i$ equals to the PI gain factor times the preset integral gain $K_{i\_Normal}$ and the active state feedback gain $G_v$ equals to the PI gain factor times the preset gain $G_{v\_Nomal}$.

$K_p$=PI Gain Factor×$K_{p\_Normal}$ $K_i$=PI Gain Factor×$K_{i\_Normal}$ $G_v$=PI Gain Factor×$G_{v\_Normal}$ When the startup feature is disabled, the PI gains are the preset PI gains.

$K_p=K_{p\_Normal}$ $K_i=K_{i\_Normal}$ $G_v=G_{v\_Normal}$

Figure 14:
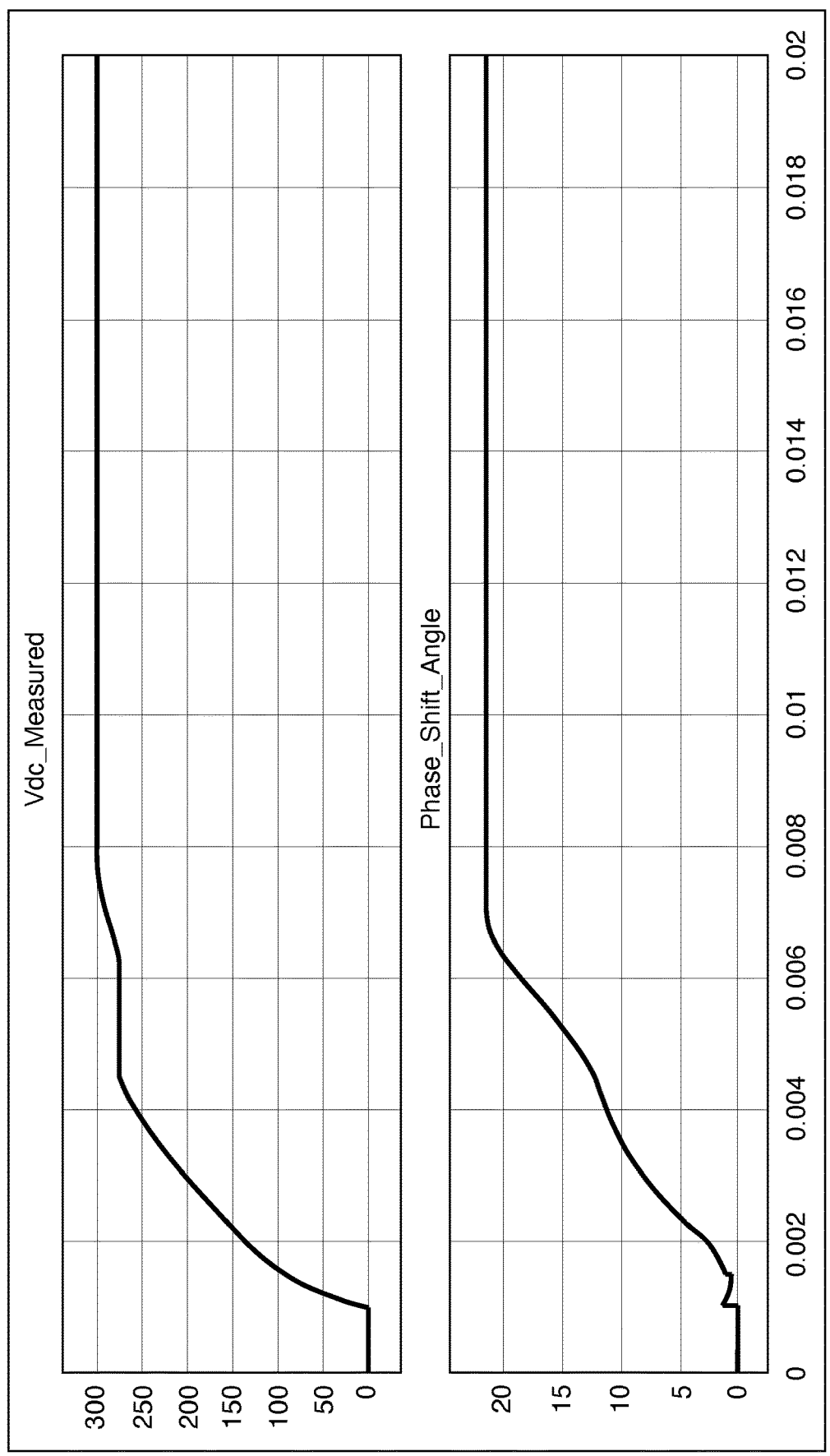
FIG. 14 shows slew rate-based control of the phase shift angle between the PWM signals for the primary converter and the secondary converter in the DAB1 converter.

The result with startup control for a single-phase DAB 100 is shown in FIG. 14. In this example embodiment, the slew limit of PI gains was set to 2000% per second (or 100% per 50 ms), the $V_{dc}$ voltage threshold for DAB startup was set to 90% of the $V_{dc}$ command and $G_v$ was set to 50% of $K_p$. The slew rate-based control of the phase shift angle between PWM signals for the primary converter 110 and the secondary converter 100 in the DAB1 converter 100 results in a reduced risk of damage to the converter 100 upon startup as compared to a typical startup procedure.

Figure 15:
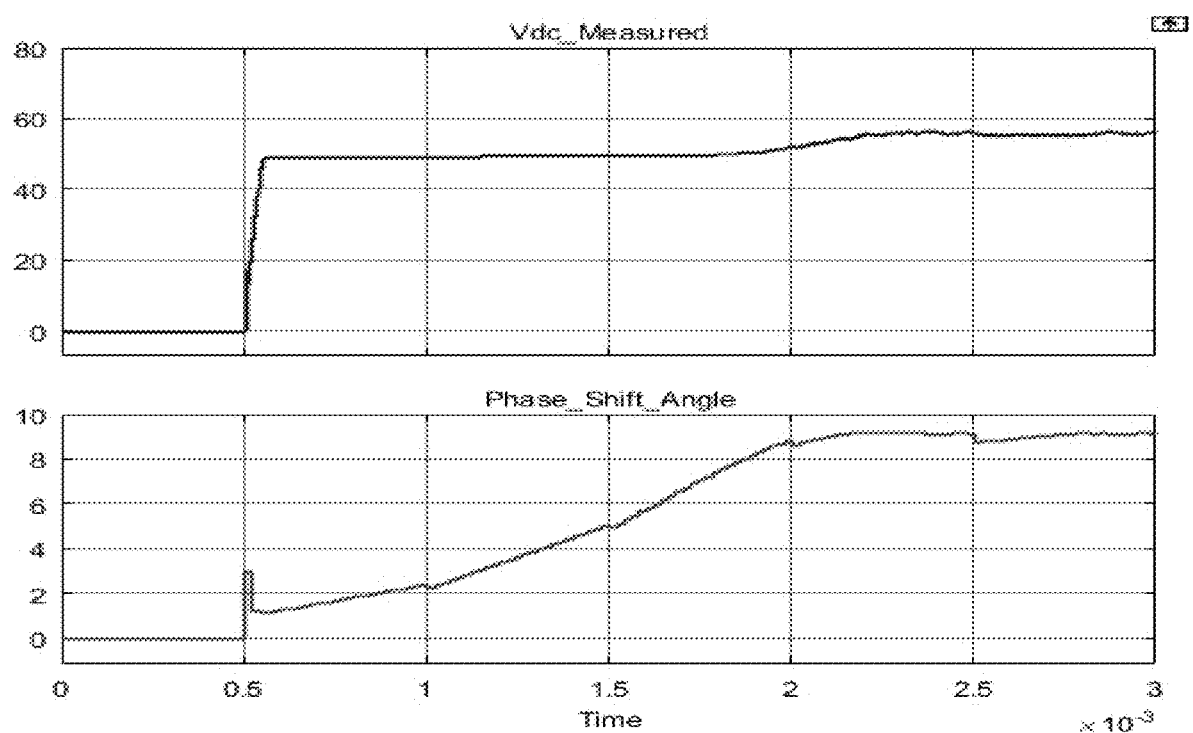
FIG. 15 shows slew rate-based control of the phase shift angle between the PWM signals for the primary converter and the secondary converter in the DAB3 converter.

The results with startup control for a DAB3 converter 100 are shown in FIG. 15. The slew limit of PI gains was set to 200% per second (or 100% per 5 ms), the $V_{dc}$ voltage threshold for DAB startup was set to 90% of the $V_{dc}$ command and $G_v$ was set to 50% of $K_p$.

DAB Pre-Charge and Startup Control

Figure 16:
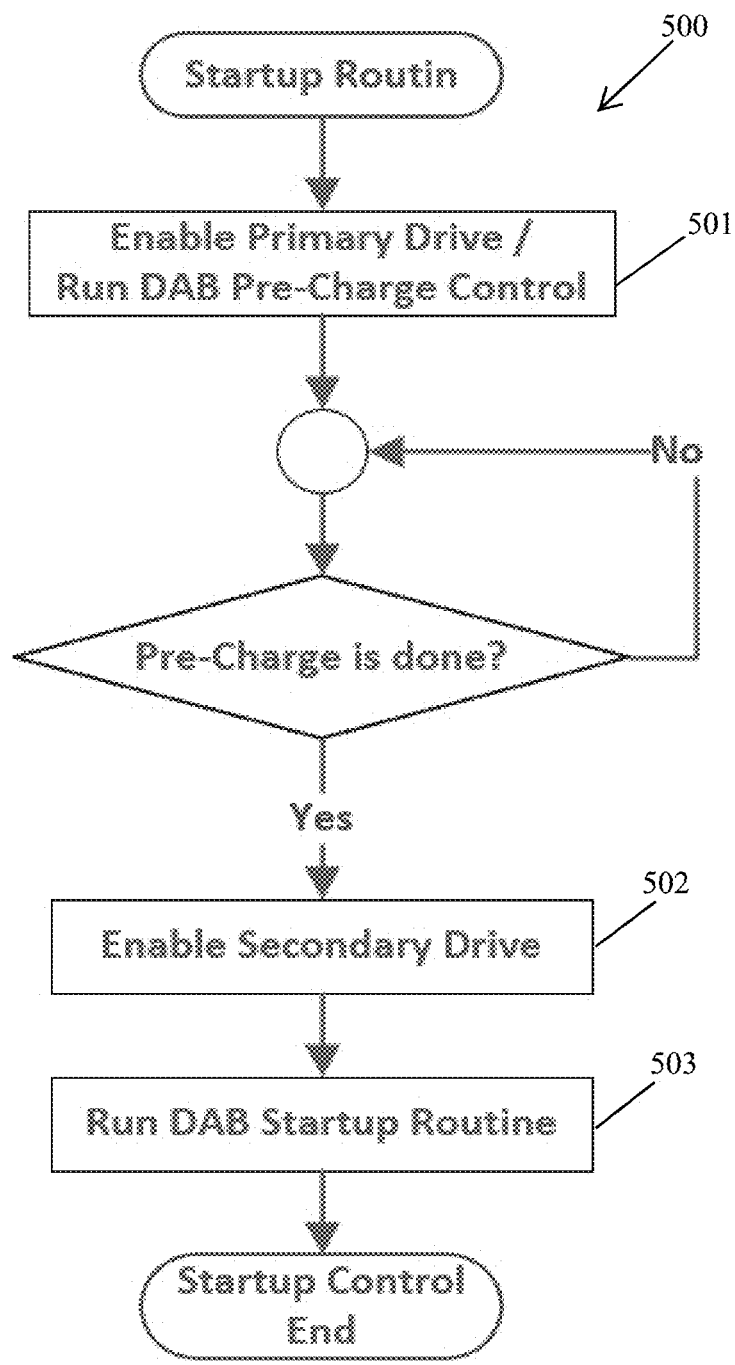
FIG. 16 depicts the startup routine, according to one embodiment, for the DAB-based converter.

In one embodiment, the DAB converter 100 startup routine includes both processes: pre-charge control 300 and startup control 400. A flowchart of the DAB startup routine is shown in FIG. 16. As shown in FIG. 16, the startup routine 500 begins at step 501 by enabling the primary drive 110 and running the converter pre-charge control scheme 300. If the pre-charge completes successfully, the secondary drive is enabled at step 502. Next, the startup control 400 is enabled at step 503. After startup control is completed, the startup routine 500 is ended.

Figure 17:
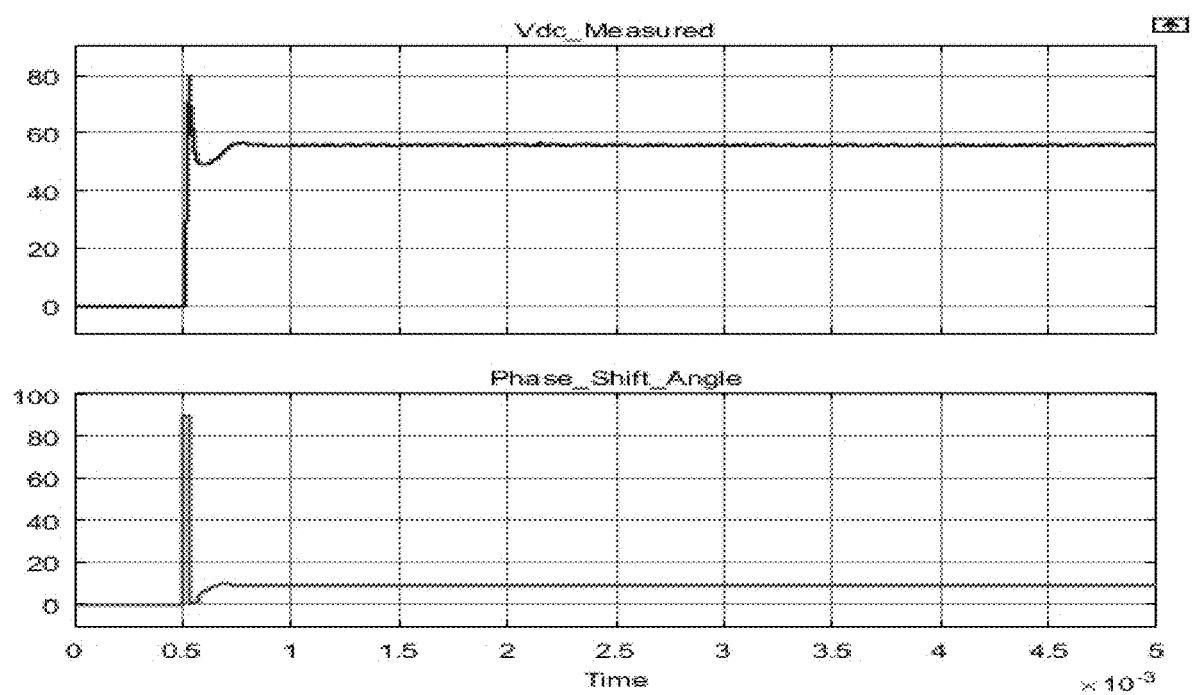
FIG. 17 is the result of the DAB3 converter at start-up without any slew rate control in the PI controller parameters.

FIG. 17 shows the results of a DAB3 converter 100 startup with the startup routine 400 disabled. As shown in FIG. 17, when the phase PWM signals for the primary converter 110 and the secondary converter 120 of the DAB3 100 are enabled, there are large changes on the phase-shift angle and there is in-rush in current through the DC bus capacitor 125 of the secondary converter 120, resulting in excessive overshoot in DC bus voltage of the secondary converter 120. More specifically, FIG. 17 shows the result of a DAD3 converter 100 at start-up without any slew rate control in the PI controller parameters. The top waveform is the voltage across the DC bus secondary converter 120 and the bottom signal indicates phase-shift between PWM signals for devices in the primary converter 110 and the secondary converter 120. The commanded output voltage for DAB3 converter 100 is 56 V.

In contrast, with the routine 500 enabled, the phase-shift angle increases smoothly, resulting in a reduction in peak current through the DC bus capacitor 125 of the secondary converter 120. The pre-charge control is enabled at 5 ms and the PWM duty cycle is set to 20%. At 2 ms, the PWM duty cycle is set to 50%. At 2.5 ms, the phase shifted PWM switching of the secondary converter 120 is enabled and the voltage PI controller is controlling the output voltage to the commanded value.

It is noted that during pre-charge of the DC bus of the secondary converter 120, the dead-time between the high-side and low-side PWM signals for the primary converter 110 is 6 μs. Using this dead time, the duty cycle for PWM signals for the primary converter 110 is tied to 20%. PWM signals for the secondary converter 120 are phase-shifted with respect to PWM signals for the primary converter 110, but controlled by slew rate.

Once pre-charge is completed and the DC bus voltage of the secondary converter 120 in the DAB3 converter 100 reaches 56 V, the dead time between the high-side and low-side PWM signals for the primary converter 110 is scaled back to 200 ns, which ensures ~50% duty cycle for PWM signals for the primary converter 110. PWM signals for the secondary converter 120 are phase-shifted with respect to PWM signals and remain within a narrow bound around 10 degrees at a given power. If power on the secondary converter 120 increases, then phase-shift between PWM signals for the primary converter 110 and the secondary converter 120 increases (by a smooth slew rate), resulting stable operation without any risk of current in-rush, excessive DC component in output currents of the primary converter 110, and any over-voltage at output of the secondary converter 120.

Thus, using the startup routine 400 for DAB1 and DAB3 converters 100, instant failure in the power devices of the secondary converter 120 can be prevented; a current in-rush through the capacitor 125 in the secondary converter 120 is eliminated; stress on the controller bandwidth of the DAB3 converter 100 is reduced, resulting in an improved design of a closed loop control system for DAB1 and DAB3 converters 100. Else, the high bandwidth designed to ensure smooth operation during pre-charge of the secondary converter DC bus could lead to instability during normal operation. Therefore, the startup routine 400 provides a trade-off between dynamic and steady state operation of DAB1 and DAB3 converters 100. Moreover, the slew rate in the PI controller parameter ensures that during an abrupt change in the output load, the primary converter does not pass on excessive DC current in the magnetic circuit of the DAB1 and DAB3 converters 100, resulting in magnetic saturation. Otherwise, the converter 100 could experience current in-rush resulting from magnetic saturation, which could lead to thermal failures. When used in vehicle applications, the routine 400 is simple to implement and can effectively nuisance faults in DAB1 and DAB3 converters 100.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

Further, the features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. In particular, one or more features in any of the embodiments described herein may be combined with one or more features from any other embodiments described herein.

Protection may also be sought for any features disclosed in any one or more published documents referred to and/or incorporated by reference in combination with the present disclosure.

What is claimed is:

1. A system for controlling a direct current to direct current converter comprising:
    a primary converter, the primary converter comprising a plurality of primary switches, the primary converter having a primary direct current terminal and a primary alternating current terminal;
    a secondary converter, the secondary converter comprising a plurality of secondary switches, the secondary converter having a secondary direct current terminal and a secondary alternating current terminal;
    a transformer, the transformer comprising a primary winding coupled to the primary alternating current terminal and secondary winding coupled to the secondary alternating current terminal;
    a current sensor associated with at least one of the primary alternating current terminal and the secondary alternating current terminal for measuring an alternating current;
    an estimator configured to estimate a direct current at the secondary direct current terminals based on the measured alternating current;
    a controller capable of operating in a startup mode and an operational mode,
        wherein the controller is configured to provide pulse width modulated primary control signals to control terminals of the primary switches in accordance with target phase offsets, wherein the primary control signals are provided prior to providing control signals to the secondary converter, and
        wherein the controller is further configured to delay providing secondary control signals to the secondary converter until the estimated direct current achieves an operational current that is below an initial startup current.

2. The system of claim 1, wherein the operational current is associated with a threshold current level that is below a declining slope inflection point of a waveform of the initial startup current.

3. The system of claim 1, wherein the operational current is reached after a period of execution of at least one pulse width modulation cycle applied to the primary switches.

4. The system of claim 1, wherein a period of a pulse width modulation cycle is proportional to a fundamental frequency of at least one of the primary control signals and the secondary control signals generated by the controller.

5. The system of claim 3, wherein the startup mode ends after the execution of at least one pulse width modulation cycle applied to each primary switch of the plurality of primary switches.

6. The system of claim 1, wherein the controller is configured to phase shift the secondary control signals with respect to a reference phase of the primary control signals during the operational mode.

7. The system of claim 1, wherein the primary switches and the secondary switches are operated at a fixed duty cycle within a range between approximately 15% duty cycle and 60% duty cycle during the operational mode.

8. The system of claim 1, wherein the primary converter comprises a single-phase converter with four transistors and the secondary converter comprises single-phase converter with four transistors.

9. The system of claim 1, wherein the primary converter comprises a three-phase converter with six transistors and the secondary converter comprises a three-phase converter with six transistors.

10. The system of claim 1, wherein the controller comprises a proportional integral controller that is configured to limit changes to the phase shift versus time during the startup mode.

11. The system of claim 10, wherein the proportional integral controller comprises an incremental slew limiter adapted to apply a gain adjustment factor.

* * * * *